July 22, 1958 W. C. BROWN 2,843,946
MANIKIN DEVICE FOR ILLUSTRATING DYNAMIC MOVEMENT
Filed Nov. 24, 1954
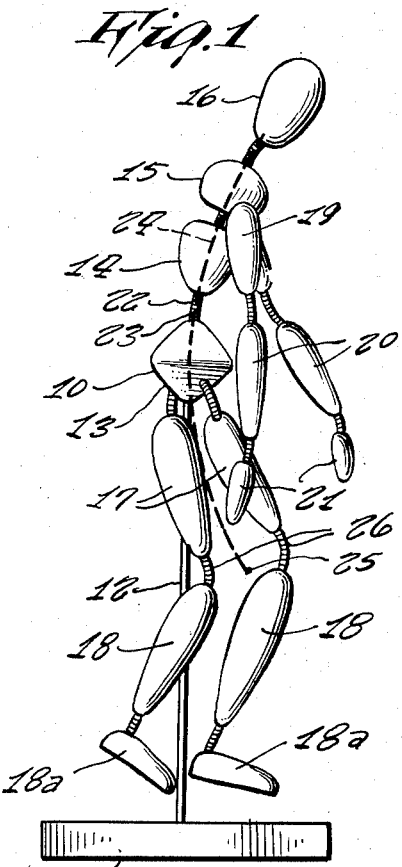
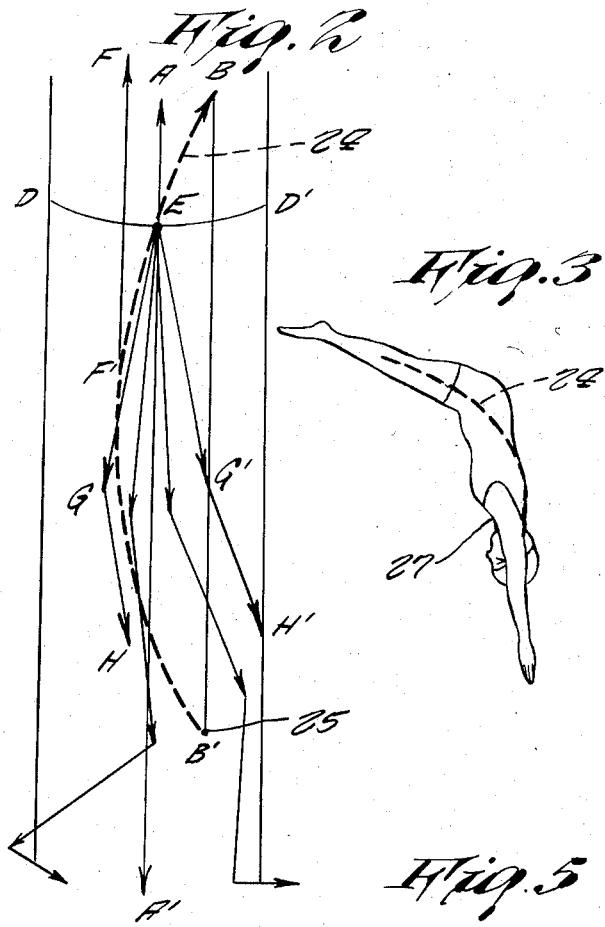
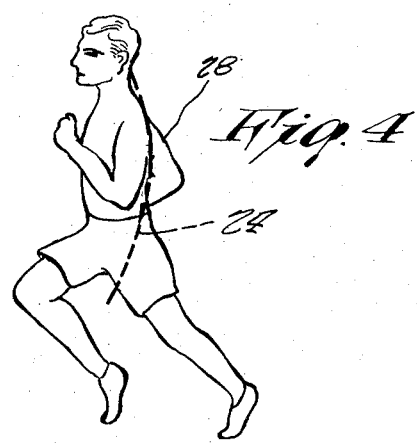
INVENTOR.
WOLSTAN CROCKER BROWN
BY Carl Miller
ATTORNEY

United States Patent Office 2,843,946
Patented July 22, 1958

2,843,946
MANIKIN DEVICE FOR ILLUSTRATING DYNAMIC MOVEMENT

Wolstan Crocker Brown, Douglaston, N. Y.

Application November 24, 1954, Serial No. 470,890

2 Claims. (Cl. 35—29)

This invention relates to manikins, and more particularly to manikins that illustrate the movements of the human body.

It is the object of this invention to provide a manikin which is capable of illustrating certain positions of the body wherein a maximum amount of bodily energy and endurance is available.

Another object of the invention is to provide such a manikin which is of durable and simple construction and will with the guidance of the formula for dynamic balance (see Fig. 2) be suitable for study of true balance in the human body, for athletes, for the armed forces, for physicians and artists.

A further object of this invention is to provide a model of the major motor units of the body, which show their relative movements when the positions of the body units are dynamic and, therefore, expressing the greatest efficiency.

A still further object of the present invention is to provide a manikin capable of disclosing the six articulations or hinges of the body (as compared with the five articulations now in general use in manikins) and therefore making the manikin capable of demonstrating the Bow principle of true dynamic balance and movement, as shown herein.

Other and more specific objects of the present invention will be apparent from the following description as read in connection with the accompanying drawing, the novel features of this invention being pointed out in the claims at the end of the specification.

Figure 1 is a perspective view of a manikin illustrating the principle of the invention.

Figure 2 is a diagram showing the principle of movement wherein a maximum of physical energy is made available in the human body.

Figures 3, 4 and 5 show various athletes using these movements and positions in their body action.

The present invention has been conceived with a view towards showing that the physical energy of the human body may be most efficiently availed of through certain specific movements and positions. It is, of course, a commonplace that the body may have awkward as well as graceful motions but beyond such vague characterizations there has been very little study of any specific formulae for achieving such qualities. However, in the present instance, it has been noted that there is at least one general rule which is perhaps unconsciously applied by almost every great athlete in achieving his best performance. Since the conscious application of this principle will be a distinct aid in arriving at a superior athletic performance in a relatively short period of time, the present invention has been developed for the purpose of demonstrating this rule in a manner which is easily comprehended by the onlooker.

As shown in the drawing, the embodiment of the invention therein illustrated comprises a manikin 10 mounted on a base 11 which is adapted for supporting the said manikin 10 upon a horizontal surface. The said base 11 may be composed of a round wooden disc and may incorporate a vertical metal rod 12 in the center thereof, said rod 12 also serving as a pivotal support within a wooden portion 13 located in and intended to indicate the pelvic region of the human body. The said rod 12 allows the said wooden portion 13, and hence the entire manikin 10 to rotate freely. Extending upwards from the top central portion of the said wooden portion 13 are found other wooden shapes indicating the abdominal region 14, the chest region 15 and the region 16 wherein the human head would be located. Similarly, from the sides of the said wooden portion 13 representing the pelvic region of the body, there extend two legs having thigh portions 17, lower leg portions 18 and foot portions 18a. In a like fashion, there extends from each side of the said wooden shape representing the chest region 15 an arm consisting of a portion representing the upper part of the arm 19, the forearm 20 and the hand 21.

Each of the said wooden indicating portions is mounted in position by means of a substantially stiff metal wire 22 around which is coiled a metal spring 23 which imparts to the entire figure a great degree of flexibility. The said wire 22 is bent so as to assume an arcuate bow-like shape from the upper part of the pelvic region 13 through the head region 16. Thus an imaginary line 24 may be drawn from the head region 16 through the central portion of the chest region 15, the abdominal region 14 and the pelvic region 13. This line 24, when extended further in a downward direction, will pass through a point 25 midway between the two knee portions 26 of the body. This bow-like curve 24 has been found common to a great number of champion athletic motions some of which are illustrated in the drawing. Thus in Figure 3, the curve 24, illustrated therein, is shown passing through the body of a diver 27. Figure 4 shows how the curve 24 appears during the bodily movement of a runner 28. And Figure 5 indicates the curve 24 in the motion of the body of a tennis player 29.

Figure 2 illustrates diagrammatically the various geometric features of the flow of forces (indicated by arrowheads) in the body when it is in Bow balance or dynamic balance. The vertical axis of the body is shown in line A—A'. The line A—A' will always pass through the point E when true or Bow balance is present in the body. Point E, the dynamic center of the body from which all true movement starts, is located between the 12th and 13th vertebrae on the spine, or in Figure 1 between unit 14 and unit 15 of the manikin. D—D' re-indicates the drop and rise of the body in dynamic movement. B—B' shows the Bow of the true balance in the body and controls the placing of all units of the body, for strength, for speed, for endurance, and is also the true basis for development of bodily beauty. This line is followed in Figure 1 of the manikin from point 25 curving up to the base of the head 16. F—F' indicates a further dynamic position of the body, but one seldom attained.

Manikin 10 can be made to assume any of the dynamic positions shown above by following curve 24. Because of the discovery of an articulation or hinge between units 14 and 15 in Figure 1, this conformation to the dynamic curve of the body is made possible. The six hinges of the human body are the ankles, the knees, the hinges of the lower hips, the hinge located at the point 22 in Figure 1, the newly discovered hinge between units 14 and 15 in Figure 1, and the neck hinge which is the top or sixth hinge or articulation of a dynamic human body.

The manikin thus serves as an exact study of the units of the body for athletics, for the arts and for health.

The balance attained by this Bow-like position is found in all champions, athletes, and hence is vital information for military training of the Armed Forces and for purposes of health. This principle of balance has been recognized as correct by representative groups in the U. S. A., England, Greece and India.

The embodiments of the invention illustrated and described hereinabove have been selected for the purpose of clearly setting forth the principles involved. It will be apparent, however, that the present invention is susceptible of being modified in respect to details of construction, combination and arrangement of parts which may be resorted to without departure from the spirit and scope of the invention as claimed.

Having thus described my invention, I claim as new and desire to secure by Letters Patent of the United States:

1. A manikin comprising in combination a base, a vertical rod secured within said base, said manikin comprising a wooden portion being located in the pelvic region of the said manikin and supported by the said vertical rod, a plurality of other wooden blocks located in the abdominal region, the chest region, the head region, the thigh region, the lower leg region, the foot region, the upper arm region, the forearm region and the hand region, of the said manikin, respectively, means for movably securing the said wooden blocks in a position wherein the center of said blocks of said head, chest, abdominal, and thigh regions define a continuous bow-like curve of adjustable substantially constant curvature, the extended lower end of said curve being midway between the knee portions defined between said respective thigh and lower leg portions of the said manikin, the upper end of which is directly above the said lower end of the said curve and within the head region of the said manikin, and the curved portion of which is coincident with the curvature of the pelvic region, the abdominal region, the chest region and the head region of the said manikin, the said chest region also being rotatable about a point located upon the said bow-like curve and allowing a corresponding rotation of the head region, the upper arm region, the forearm region and the hand region of the said manikin.

2. A device of the type set forth in claim 1, said means for movably securing the said wooden blocks in the said position comprising a curved wire which normally assumes the shape of the said bow-like curve and a flexible metal spring coiled around the said wire, the said wire and spring permitting an elastic motion of the said manikin so that in its normal position, the termini of the said bow-like curve may be connected by an imaginary line which is always vertical, but allowing the upper half of the said bow-like inclination to be moved into a vertical position, the said wire and spring also being bent so as to simulate the various joints of the body of the said manikin.

References Cited in the file of this patent

UNITED STATES PATENTS

| 1,494,872 | Weber | May 20, 1924 |
| 2,118,092 | Loeffel et al. | May 24, 1938 |
| 2,136,207 | Ewerhardt | Nov. 8, 1938 |
| 2,696,056 | Kistler et al. | Dec. 7, 1954 |

FOREIGN PATENTS

| 147,832 | Switzerland | Sept. 16, 1931 |